United States Patent [19]

Burstain

[11] Patent Number: 4,851,488

[45] Date of Patent: Jul. 25, 1989

[54] PROCESS FOR ALTERING HYDROGENATED POLYMER COMPOSITIONS FROM HIGH MELT FLOW TO LOW MELT FLOW

[75] Inventor: Israel G. Burstain, Houston, Tex.

[73] Assignee: Shell Oil Company, Houston, Tex.

[21] Appl. No.: 41,501

[22] Filed: Apr. 23, 1987

[51] Int. Cl.$^4$ .................... C08F 2/38; C08F 4/64; C08F 10/06

[52] U.S. Cl. ................. 526/78; 526/123; 526/125; 526/130; 526/139; 526/141; 526/142; 526/156; 526/904; 526/905; 585/255

[58] Field of Search ............ 526/78, 86, 905, 79, 526/123, 125, 130, 904, 139, 141, 142; 525/339; 585/275, 277, 255

[56] References Cited

U.S. PATENT DOCUMENTS

| | | | |
|---|---|---|---|
| 3,110,707 | 11/1963 | Bua et al. ................ | 260/93.7 |
| 3,146,223 | 8/1964 | Cheney ................... | 260/93.7 |
| 3,428,619 | 2/1969 | Hawkins et al. ........ | 260/93.7 |
| 3,531,448 | 9/1970 | Johnson .................. | 260/85.1 |
| 3,595,942 | 7/1971 | Wald et al. .............. | 260/689 |
| 3,652,527 | 3/1972 | Trieschmann et al. . | 260/93.7 |
| 3,658,780 | 4/1972 | Scoggin .................. | 260/93.7 |
| 3,673,281 | 6/1972 | Bronstert et al. ....... | 525/339 |
| 3,912,701 | 10/1975 | Dunn, Jr. ................ | 260/93.7 |
| 3,922,322 | 11/1975 | Roger et al. ............ | 260/878 |
| 4,200,714 | 4/1980 | Mahoney et al. ....... | 585/255 X |
| 4,673,714 | 6/1987 | Kishimoto et al. ..... | 525/314 |

FOREIGN PATENT DOCUMENTS

| | | | |
|---|---|---|---|
| 0825958 | 12/1959 | United Kingdom ..... | 526/905 |
| 1536358 | 12/1978 | United Kingdom ..... | 526/86 |
| 1549793 | 8/1979 | United Kingdom ..... | 526/86 |

*Primary Examiner*—Joseph L. Schoffer
*Assistant Examiner*—F. M. Teskin

[57] ABSTRACT

A process for polymerizing or copolymerizing a member of the group consisting of an alpha olefin or mixtures thereof, consisting of the steps of:

polymerizing an alpha olefin in a polymerization reactor using a polymerization catalyst, a cocatalyst, and an amount of hydrogen adjusted for molecular weight control as measured by melt flow;

rapidly changing the melt flow of the polymerized alpha olefin from high to low melt flow by reacting a portion of the unreacted hydrogen in the reactor with a quantity of the alpha olefin present therein by interaction with a hydrogenation catalyst; and removing the hydrogenation catalyst from the reactor through continuous exchange of the reactor contents.

31 Claims, No Drawings

PROCESS FOR ALTERING HYDROGENATED POLYMER COMPOSITIONS FROM HIGH MELT FLOW TO LOW MELT FLOW

BACKGROUND OF THE INVENTION

In olefin polymerizations, the polymer melt flow is controlled by varying the hydrogen/propylene ratios in the reactor. At present, changes in polymer melt flow are accomplished by changing the hydrogen concentrations in the reactor. Traditionally, melt flow transitions from low melt flow to high melt flow were accomplished by, quickly adding hydrogen into the reactor. Similarly, to achieve a melt flow transition from high melt flow to low melt flow, extensive venting of the reactor has been traditionally required to reduce the hydrogen concentration of the material contained in the reactor. This venting of the reactor to obtain hydrogen concentrations at the desired level can take many hours and cause expensive production delays. For example, using conventional melt flow transition techniques and propylene as the polyolefin in the polymerization reaction, to reduce melt flow from high to low, venting of the reactor can require up to 40 hours at a vent rate of 6000 lbs/hr propylene to reduce melt flow from 50 to 3.

Transition from a higher melt flow to a lower one is dependent upon reactor residence time, reactor design, and the magnitude of the change in the melt flow value. The time to effect a high melt flow to low melt transition by venting can vary from minutes to many hours depending upon the three above-noted parameters. To overcome this extremely costly method which has a tendency to cause production delays, a novel process for adjusting polymer melt flow from high to low has been developed. Practice of this novel invention results in a high melt flow to low melt flow transition time which takes less than about 50% and even as little as about 10% to about 1% of the conventional transition time previously required for conventional venting.

SUMMARY OF THE INVENTION

A process for polymerizing a member of the group consisting of an alpha olefin or mixtures thereof, consisting of the steps of:
  polymerizing an alpha olefin in a polymerization reactor using a polymerization catalyst, a cocatalyst, and an amount of hydrogen adjusted for molecular weight control as measured by melt flow;
  rapidly changing the melt flow of the polymerized alpha olefin from high to low melt flow by reacting a portion of the unreacted hydrogen in the reactor with a quantity of the alpha olefin present therein by interaction with a hydrogenation catalyst; and
  removing the hydrogenation catalyst from the reactor through continuous exchange of the reactor contents.

DESCRIPTION OF THE INVENTION

The novel process can use an alpha olefin such as propylene, butene, hexene, octene, ethylene, polyethylene or other linear or branched alpha olefins. The polymerization of the alpha olefin can preferably occur at a temperature in the range between 20° C. and 160° C., although for certain alpha olefins, a temperature range between 40° C. and 120° C. can be used. Low temperature polymerization between 60° C. and 90° C., can also be performed and the novel advantage of the present invention can be obtained.

In the inventive process, the polymerization catalyst can be an unsupported catalyst for olefin polymerization. This unsupported catalyst can contain titanium, chromium, vanadium, zirconium, cobalt or a mixture thereof. Titanium halide is an unsupported catalyst usable within the scope of the present invention.

Alternatively, it is possible to carry out the present invention using a supported catalyst such as a polymerization catalyst on a support of a magnesium halide. Magnesium chloride is a preferred magnesium halide support. The support for a polymerization catalyst useful within the scope of the present invention can be either a titanium halide, a silica, a magnesia, an alumina, a mixed metal oxide, a non-chemically reactive organic polymer or a non-chemically reactive inorganic polymer. The preferred titanium halide support is titanium chloride. Other supported catalysts usable within the present invention include chromium, vanadium, zirconium and cobalt containing supported catalyst. Supported catalysts which are mixtures of titanium, chromium, vanadium, zirconium and cobalt supported catalysts are also usable within the scope of the present invention.

The cocatalyst usable within the scope of the inventive process can be either a metal alkyl, a metal alkyl alkoxide, a metal alkyl halide, a metal alkyl hydride or mixtures thereof.

A selectivity control agent can be used in the inventive process. Aromatic esters, amines, hindered amines, esters, phosphites, phosphates, aromatic diesters, alkoxy silanes, aryloxy silanes, silanes, hindered phenols and mixtures thereof may be useful as the selectivity control agent in the inventive process.

The present invention provides a novel process for polymerizing alpha olefins by eliminating the costly traditional method of changing melt flow of the reactor contents during polymerization from high to low by venting. The present inventive process reduces the hydrogen concentrations in the reactor contents containing alpha olefins to a level wherein the reactor contents have the desired melt flow index in less time than is currently required by conventional procedures. This novel method involves reacting the hydrogen with an alpha olefin, such as propylene in the reactor using a novel catalyst system.

The novel polymerization or copolymerization of the alpha olefin preferably occurs in the range of 20° C. to 160° C., for the polymerization or copolymerization of higher olefins, such as poly-4-methyl-1 pentene and hexene, and decene. It is also possible to polymerize or copolymerize alpha olefins in the novel process using temperatures in the range of 40° C.–120° C., when olefins such as 1-butene are used. Use of this more narrow temperature range with olefins like 1-butene in the novel process provide a product with certain desirable isotacticities. In this process it is possible to polymerize or copolymerize an alpha olefin such a propylene in the range of 60° C.–90° C. and obtain the desired results. In another embodiment of the present invention, the reactor can be heated to temperatures in the range of about 25° C. to about 100° C. which facilitates polymerization.

Given the above parameters, polymerization or copolymerization of the alpha olefin can be carried out by known alpha olefin polymerization processes.

The reactor usable in the present invention can be either a liquid phase reactor a gas phase reactor, a solvent slurry reactor or a or a solution polymerization reactor. These kind of reactors have been described in U.S. Pat. Nos. 3,652,527, 3,912,701, 3,922,322, 3,428,619, 3,110,707 and 3,658,780 and reference to these types of reactors is incorporated herewith.

During polymerization or copolymerization, such as by the above described process, it has been discovered that the catalytic reduction of the hydrogen to carry out the transition from high to low melt flow can be performed by direct injection of one of the several hydrogenation catalysts into the polymerization or copolymerization reactor. Hydrogenation catalysts useful for olefin hydrogenation, including nickel, platinum, palladium catalysts are preferred for use in this inventive process. A more extensive list of hydrogenation catalysts usable within the present invention follows.

It is preferred to minimize the deleterious effects that the hydrogenation catalyst will have on the polymerization catalyst activity and on polymer quality when the novel process using direct injection of the hydrogenation catalyst approach is carried out. The hydrogenation catalyst can be in a carrier of hydrocarbon solvent, such as toluene, prior to direct injection of the catalyst into the reactor.

Alternatively, it has been discovered that catalytic reduction of the hydrogen can be carried out outside the polymerization reactor by circulating the reactor contents or part of the reactor contents through a fixed, external catalytic bed containing a hydrogenation catalyst, such as the nickel hydrogenation catalyst. An advantage of the external fixed bed system is that it is not necessary to deactivate or remove the hydrogenation catalyst from the fixed bed following the catalytic reduction of the hydrogen concentration, thus potentially saving even more money and steps in polymerization or copolymerization reactions.

In the novel process, the hydrogen concentration of the reactor contents can be adjusted to be in the range of about 0.01 mole percent to about 20 mole percent to provide a melt flow of polymerized product between about 0.01 and 2,000 dg/min. The novel process can be used to adjust the hydrogen concentration of the reactor contents such that the melt flow of polymerized product is between about 0.1 to about 1,000 dg/min and in some cases between about 0.1 to about 700 dg/min.

The hydrogenation catalysts useful to obtain the fast reduction in transition time from high melt flow to low melt flow can be a transition metal catalyst useful for the hydrogenation of alpha olefins (such as benzenetricabonylchromium, dibenzenechromium, dihydridochlorotris(triphenylphosphine iridium (III), hydridodichlorotirs(triphenylphosphine)iridium (III) and dicarbonylcyclopentadienylcobalt). When a transition metal catalyst is used as the hydrogenation catalyst, a preferred catalyst of this type is a supported nickel catalyst. Supported platinum catalyst and supported palladium catalyst can also be used within the scope of this invention. It is preferred to use transition metal catalysts supported on either alumina, silica, carbon or carborundum.

The most preferred nickel catalyst usable within the scope of the present invention is bis-1,5-cyclooctadiene nickel. Nickel octanoate is another preferred nickel catalyst usable within the scope of the present invention.

When the hydrogenation catalyst is directly added to the reactor, the preferred amount of hydrogenation catalyst, in parts per million can extend from about 0.01 to about 3,000 parts per million down to 0.01 to 100 parts per million. Between 1 to about 20 parts per million of hydrogenation catalyst has been found useful within the scope of the present invention depending on which hydrogenation catalyst is used in the polymerization. In the most preferred embodiment of the present invention, using the bis-1,5-cyclooctadiene nickel between about 5 to about 15 parts per million of the nickel catalyst can be added to the reactor to provide the desired results.

Other hydrogenation catalysts that may be effective within the scope of the present invention, include other nickel hydrogenation catalysts, nickel in graphite, such as graphimet Ni-10; palladium in graphite such as graphimet Pd-1; benzenetricarbonylchromium, $C_6H_6Cr(CO)_3$; dibenzenechromium, $(C_6H_6)_2Cr$; dicarbonylcyclopentadienylcobalt, $(C_5H_5)Co(CO)_2$; dihydridochlorotris(triphenylphosphine) iridium (III), $Ir(H_2)Cl[P(C_6H_5)_3]_3$; hydridodichlorotris(triphenylphosphine)iridium (III), $Ir(H)Cl_2[P(C_6H\ldots;$ bis(1,5-cyclooctadiene)nickel, $(CH_8H_{12})_2Ni$; bis(cyclopentadienyl)nickel, dry, $Ni(C_5H_5)_2$; tetrakis(diethylphenylphosphonite)nickel, $[C_6H_5P(OC_2H_5)_2]_4Ni$; tetrakis(methyldiphenylphosphine)nickel, $[(C_6H_5)_2PCH_3]_4Ni$; tetrakis(triethylphosphine)nickel, $[(C_2H_5)_3P]_4Ni$; tetrakis(triphenylphosphine)nickel, $[(C_6H_5)_3P]_4Ni$; tetrakis(trifluorophosphine)nickel, $(PF_3)_4Ni$; tetrakis(triphenylphosphine)palladium, $Pd[(C_6H_5)_3P]_4$; bis(triphenylphosphine)platinum(II) chloride, $PtCl_2[(C_6H_5)_3P]_2$; dichloro(cycloocta-1,5-diene)platinum(II), $Pt(C_8H_{12})Cl_2$; tetrakis(triphenylphosphine)platinum, $Pt[(C_6H_5)_3P]_4$ chloro(norbornadiene)rhodium(I) dimer, $[RhCl(C_7H_8)]_2$; dihydridotetrakis(triphenylphosphine)ruthenium(II), $[(C_6H_5)_3P]_4RuH_3$; potassium hexachlororuthenate(IV), $K_2RuCl_6$; and tris(triphenylphosphine)ruthenium(II) chloride, $[(C_6H_5)_3P]_3RuCl_2$.

A nickel catalyst is the preferred catalyst within the scope of the present invention since it is both insensitive to the presence of tri-ethyl aluminum (TEA), PEEB and $Si(OR)_x(R')_{4-x}$ wherein $0 < x \leq 4$, but capable of being poisoned by reagents containing reactive chloride. Sensitivity to active chloride or water can serve to limit the life of such a hydrogenation catalyst in the reactor, especially when the catalyst contains a transition metal olefin polymerization catalyst containing titanium, chromium, vanadium, zirconium or cobalt. Poisoning of the hydrogenation catalyst can permit continuation of the polymerization reaction at the desired lower polymer melt flow without further loss of hydrogen ($H_2$). Additionally, hydrogenation catalysts such as nickel octanoate can be used in the novel process since they are easily poisoned by compounds such as, di-ethyl aluminum chloride (DEAC), and thereby provide a reaction wherein the hydrogen consumption can be controlled. Hydrogenation catalysts which are supported transition metal catalysts, supported on a component consisting of alumina, silica, clay, carbon, layered clay, are also effective.

In the above described direct injection process, it has been found that removal of the hydrogenation catalyst from the reactor or deactivation of the hydrogenation catalyst once the hydrogen concentration is reduced to the desired level is very helpful to achieve good polymerization and copolymerization results. Another process for deactivating hydrogenation catalysts involves poisoning the hydrogenation catalyst in the reactor by adding a reactive chlorine containing compound, such as DEAC, (diethyl aluminum chloride), silicon tetrachloride, ethyl aluminum dichloride, chlorine gas or combination thereof to the reactor to stop any unwanted consumption of hydrogen after the desired level of hydrogen concentration is achieved. In a continuous polymerization or copolymerization process, the depletion or removal of the hydrogenation catalyst can be achieved by gradually exchanging the reactor contents.

The present invention can be carried out in a variety of reactors such as gas phase reactors, liquid phase reactors, solvent slurry reactors or solution reactors, to achieve the novel rapid transition time of polymer product from high melt flow to low melt flow is less than 50% of the conventional transition time for reducing melt flow of product. It has been found that the novel process can reduce high to low melt flow transition time as much as 1% to 10% of the transition time traditionally required.

EXAMPLE 1

To a one (1) gallon polymerization reactor, 2700 cc of liquid propylene was added. The liquid propylene was initially maintained at ambient temperature, 20°-24° C. in the reactor. The reactor was then heated to about 60° C. and hydrogen gas was directly injected into the reactor. Hydrogen was injected into the reactor in an amount to establish an initial liquid phase concentration of hydrogen in the reactor at about 0.15% mol. About 0.14 mmole of diphenyl dimethoxy silane, 0.56 mmole of triethylaluminum and 0.008 mmole titanium equivalent of a polymerization catalyst were added to the reactor. The temperature in the reactor was then allowed to increase to 67° C.

For 20–30 minutes, additional hydrogen was directly added to the reactor until a liquid phase concentration of hydrogen, of around 0.5% mol was obtained. A nickel containing solution was added to the reactor, to a level of 4 ppm Ni (basis—total weight of reactor contents). The nickel solution contained nickel octanoate, cyclohexane and triethyl aluminum (TEA), (TEA stabilized the solution). Immediately following the addition of the nickel solution a temperature exotherm occurred, between about 2° and 4° C. indicating a significant increase in energy being evolved from the reactor. Gas chromatographic analysis of the nonpolymerized liquid contents indicated that an immediate reduction in hydrogen concentration occurred.

After 25 minutes, the hydrogen concentrations were reduced, essentially to zero. A substantial increase in molecular weight of the product formed after the initial injection of the nickel solution (containing nickel hydrogenation catalyst) was confined by gel permeation chromatography. The final yield was about 1.08 million grams polypropylene per gram titanium, indicating no significant loss in catalyst performance.

EXAMPLE 2

The novel control of hydrogen during melt flow transition in an alpha olefin polymerization reaction was tested in a continuous gas phase reactor. During normal operation, the reactor was continuously fed with propylene, a Ti supported Shell Shac ® catalyst (Shell high activity catalyst) with an aluminum alkyl as cocatalyst, a selectivity control agent (SCA) and hydrogen to maintain a desired but high polymer melt flow.

The experiment started by first establishing a base line for hydrogen consumption during the reaction. This base line was established by stopping the catalyst-/cocatalyst, SCA and hydrogen flows and blocking the reactor vent. The hydrogen concentration in the reactor was monitored by Gas Chromatography (GC). The GC analysis showed that the hydrogen concentration was reduced from 2.8% mole to 2.1% mole after 1.5 hours. This change in rate suggests that under normal polymerization, hydrogen is being consumed or lost at a rate of 0.008%/min.

EXAMPLE 3

The process described in Example 2 was repeated, however, instead of stopping the catalyst and cocatalyst feed as well as the hydrogen feed, the polymerization reaction was maintained as a continuous flow. A steady state of hydrogen concentration was maintained by continuously feeding hydrogen into the reactor. When a steady reactor operation was achieved, the hydrogen feed and the reactor vent were shut down and the "initial" hydrogen concentration was recorded as shown in Table 1. This was followed with an injection of the hydrogenation catalyst (bis 1,5-cyclooctadiene Ni(O) stabilized with aluminum alkyl). The catalyst was injected into the reactor in a single shot to achieve a calculated value of 5 ppm Ni (basis—the polymer weight in the reactor bed). During this process the polymer production was maintained at a constant rate by continuously feeding propylene catalyst, cocatalyst and the selectivity control agent into the reactor. The changes in the hydrogen concentrations were monitored by GC. The experimental data is summarized in Table 1.

EXAMPLE 4

The process described in Example 2 was repeated with the injection of same the hydrogenation catalyst but at a 10 ppm Ni concentration (basis—the polymer weight in the reactor bed). This data is summarized in Table 2.

EXAMPLE 5

The process described in Example 3 was repeated with the injection of the same hydrogenation catalyst but at 15 ppm Ni concentration (basis—the polymer weight in the reactor bed). This data is summarized in Table 3.

The data summarized in Table 4 shows that the injection of the hydrogenation catalyst had no deleterious effect on the polymerization catalyst performance. The lower than theoretical levels of Ni in the polymer appears to be due to the normal polymer bed exchange that occurs during the polymerization reaction.

TABLE 1

| Hydrogen Control (Injection of 5 ppm (Ni) Catalyst) | | | | |
|---|---|---|---|---|
| 1 Time Mins | 2 Bed Temp °C. | 3 Inlet Temp °C. | 4 Mol H$_2$% | 5 Mol C$_3$H$_8$% |
| 0 | 65.0 | 61.0 | 5.270 | 1.014 |
| 5 | 65.8 | 60.5 | 5.080 | 1.026 |
| 10 | 64.0 | 59.5 | 4.500 | 1.026 |
| 15 | 63.5 | 59.5 | 4.280 | 1.507 |
| 20 | 65.5 | 60.2 | 4.140 | 1.507 |
| 25 | 65.3 | 60.3 | 3.850 | 1.732 |
| 30 | 65.0 | 60.1 | 3.850 | 1.861 |
| 35 | 65.1 | 60.0 | 3.700 | 1.861 |
| 40 | 65.7 | 60.0 | 3.700 | 1.955 |
| 45 | 65.2 | 59.5 | 3.550 | 2.019 |
| 50 | 64.5 | 59.5 | 3.460 | 2.019 |
| 55 | 64.0 | 59.5 | 3.460 | 2.096 |
| 60 | 65.1 | 59.0 | 3.360 | 2.096 |
| 70 | 65.0 | 59.7 | 3.040 | 2.137 |
| 80 | 64.5 | 60.1 | 3.000 | 2.115 |

TABLE 1-continued

Hydrogen Control
(Injection of 5 ppm (Ni) Catalyst)

| 1 Time Mins | 2 Bed Temp °C. | 3 Inlet Temp °C. | 4 Mol H$_2$% | 5 Mol C$_3$H$_8$% |
|---|---|---|---|---|
| 90 | 65.5 | 60.0 | 2.930 | 2.119 |
| 100 | 64.0 | 60.0 | 2.850 | 2.180 |
| 110 | 64.8 | 60.0 | 2.790 | 2.204 |
| 120 | 65.0 | 60.3 | 2.790 | 2.175 |

TABLE 2

Hydrogen Control
(Injection of 10 ppm (Ni) Catalyst)

| 1 Time Mins | 2 Bed Temp °C. | 3 Inlet Temp °C. | 4 Mol H$_2$% | 5 Mol C$_3$H$_8$% |
|---|---|---|---|---|
| 0 | 65.6 | 60.5 | 4.890 | 0.995 |
| 5 | 66.5 | 58.5 | 4.890 | 0.995 |
| 10 | 64.8 | 59.3 | 4.890 | 0.971 |
| 15 | 65.0 | 59.5 | 4.890 | 0.971 |
| 20 | 65.3 | 59.3 | 4.190 | 1.500 |
| 25 | 64.8 | 59.5 | 3.410 | 2.050 |
| 30 | 65.0 | 60.0 | 3.410 | 2.050 |
| 35 | 65.6 | 59.7 | 3.030 | 2.420 |
| 40 | 65.2 | 59.3 | 3.030 | 2.420 |
| 45 | 64.9 | 59.8 | 2.760 | 2.600 |
| 50 | 65.1 | 59.9 | 2.570 | 2.690 |
| 55 | 65.5 | 59.6 | 2.570 | 2.690 |
| 60 | 65.4 | 59.5 | 2.370 | 2.790 |
| 70 | 64.9 | 59.8 | 2.370 | 2.790 |
| 80 | 65.6 | 58.8 | 2.160 | 2.860 |
| 90 | 64.6 | 60.2 | 1.970 | 2.840 |
| 100 | 65.6 | 59.8 | 1.970 | 2.890 |
| 110 | 64.9 | 60.3 | 1.920 | 2.860 |
| 120 | 65.5 | 59.5 | 1.850 | 2.910 |

TABLE 3

Hydrogen Control
(Injection of 15 ppm (Ni) Catalyst)

| 1 Time Mins | 2 Bed Temp °C. | 3 Inlet Temp °C. | 4 Mol H$_2$% | 5 Mol C$_3$H$_8$% |
|---|---|---|---|---|
| 0 | 65.0 | 60.5 | 3.340 | 1.060 |
| 5 | 65.2 | 58.9 | 3.270 | 1.053 |
| 10 | 64.8 | 58.0 | 1.960 | 2.187 |
| 15 | 64.2 | 58.0 | 1.960 | 2.187 |
| 20 | 63.5 | 58.0 | 1.430 | 2.668 |
| 25 | 63.0 | 58.2 | 1.430 | 2.668 |
| 30 | 64.8 | 60.5 | 1.100 | 2.962 |
| 35 | 65.1 | 60.6 | 1.100 | 2.962 |
| 40 | 65.0 | 60.8 | 0.881 | 2.969 |
| 45 | 66.0 | 60.8 | 0.686 | 2.964 |
| 50 | 65.1 | 60.0 | 0.686 | 2.964 |
| 55 | 65.0 | 60.0 | 0.605 | 3.055 |
| 60 | 64.9 | 59.8 | 0.605 | 3.055 |
| 70 | 64.9 | 60.1 | 0.469 | 3.146 |
| 80 | 65.2 | 60.0 | 0.444 | 3.173 |
| 90 | 64.9 | 60.0 | 0.398 | 3.168 |
| 100 | 64.9 | 60.0 | 0.369 | 3.175 |
| 110 | 65.0 | 60.2 | 0.344 | 3.125 |
| 120 | 65.3 | 60.4 | 0.283 | 3.007 |

TABLE 4

Hydrogen Control
(Product Analysis)

| Run # | Ni Catalyst Injection[1] (ppm) | Ti (ppm) | XS[2] | Total Ash (ppm) | Total Ni In Polymer (ppm) |
|---|---|---|---|---|---|
| 1 | 5 | 2.7 | 5.1 | 150 | 2.0 |
| 2 | 10 | 2.4 | 4.6 | 210 | 2.1 |
| 3 | 15 | 2.7 | 4.25 | 290 | 4.9 |

[1]Basis - reactor polymer bed weight.
[2]% wt xylene solubles.

What is claimed is:

1. A process for the polymerization or copolymerization of an alpha olefin consisting of the steps of:
   Polymerizing an alpha olefin in a polymerization reactor using a polymerization catalyst, a cocatalyst, and an amount of hydrogen adjusted for molecular weight control as measured by melt flow;
   Rapidly changing the melt flow of the polymerized alpha olefin from high to low melt flow by reacting a portion of the unreacted hydrogen in the reactor with a quantity of the alpha olefin present therein by interaction with a hydrogenation catalyst which is added to the polymerization reactor; and
   Removing the hydrogenation catalyst from the reactor through continuous exchange of the reactor contents.

2. The process of claim 1, wherein the polymerization of the alpha olefin occurs in the reactor at a temperature in the range between about 20° C. and about 160° C.

3. The process of claim 1, wherein the polymerization of the alpha olefin occurs in the reactor at a temperature in the range between about 40° C. and about 120° C.

4. The process of claim 1, wherein the polymerization of the alpha olefin occurs in the reactor at a temperature in the range between about 60° C. and about 90° C.

5. The process of claim 1, wherein said polymerization catalyst is an unsupported catalyst for olefin polymerization, containing a member of the group consisting of: titanium, chromium, vanadium, zirconium, cobalt and mixtures thereof.

6. The process of claim 1, wherein said polymerization catalyst is a supported catalyst.

7. The process of claim 6, wherein said supported catalyst is a supported titanium catalyst.

8. The process of claim 6, wherein said polymerization catalyst is on a support of magnesium halide.

9. The process of claim 8, wherein said magnesium halide is magnesium chloride.

10. The process of claim 6, wherein said polymerization catalyst is on a support which is a member of the group consisting of: titanium halide, silica, magnesia, alumina, mixed metal oxides, non-chemically reactive organic polymers, and non-chemically reactive inorganic polymers.

11. The process of claim 10, wherein said titanium halide is a titanium chloride.

12. The process of claim 1, wherein said cocatalyst is a member of the group consisting of:
   a metal alkyl, a metal alkyl alkoxide, a metal alkyl halide and a metal alkyl hydride and mixtures thereof.

13. The process of claim 12, wherein the metal alkyl is aluminum alkyl.

14. The process of claim 1, wherein the step of polymerizing an alpha olefin in a polymerization reactor further consists of using a selectivity control agent which is a member of the group consisting of:
   ethers, aromatic, esters, amines, silanes, phosphates, phosphites, alkoxy silanes, aryloxy silanes, hindered phenols and mixtures thereof.

15. The process of claim 1, wherein said hydrogen concentration is adjusted to be in the range of about 0.01 mole% to about 20 mole% to provide a melt flow of polymerized product over a range of between about 0.1 to about 2000 dg/min.

16. The process of claim 1, wherein said melt flow range is between about 0.1 to about 1000 dg/min.

17. The process of claim 1, wherein said hydrogenation catalyst is a transition metal catalyst useful for the hydrogenation of alpha olefins.

18. The process of claim 17, wherein the transition metal catalyst is a member of the group consisting of: a supported nickel catalyst, a supported platinum catalyst, a supported palladium catalyst.

19. The process of claim 18, wherein said transition metal catalyst is supported on a member of the group consisting of alumina, silica, carbon and carborundum.

20. The process of claim 17, wherein said transition metal catalyst is bis-1,5-cyclooctadiene nickel.

21. The process of claim 17, further comprising the step of stabilizing said transition metal catalyst with an alkyl aluminum in a hydrocarbon solvent.

22. The process of claim 21, wherein said alkyl aluminum is triethyl aluminum.

23. The process of claim 17, wherein said transition metal catalyst is nickel octanoate.

24. The process of claim 1, wherein in the step of removing the hydrogenation catalyst, a fixed bed external to the reactor is used to contain said hydrogenation catalyst.

25. The process of claim 1, wherein the amount of hydrogenation catalyst added to the reactor is in the range of about 0.01 to about 3000 ppm based on the total weight of the total reactor solids.

26. The process of claim 1, wherein the amount of hydrogenation catalyst added to the reactor is in the range of about 0.1 to about 100 ppm based on the total weight of the total reactor solids.

27. The process of claim 1, wherein the amount of hydrogenation catalyst added to the reactor is in the range of about 1 to about 20 ppm based on the total weight of the total reactor solids.

28. The process of claim 1, wherein the amount of hydrogenation catalyst added to the reactor is in the range of about 5 to about 15 ppm based on the total weight of the total reactor solids.

29. The process of claim 1, wherein said rapid transition from high melt flow to low melt flow takes less than about 50% of the conventional transition time for reducing melt flow of reactor products.

30. The process of claim 1, wherein said rapid transition from high melt flow to low melt flow takes about 1% to about 10% of the conventional transition time for reducing melt flow of reactor products.

31. The process of claim 1, wherein said reactor is a member of the group consisting of: a gas phase reactor, liquid phase reactor, a solvent/slurry reactor and a solution reactor.

* * * * *